Figure 1:
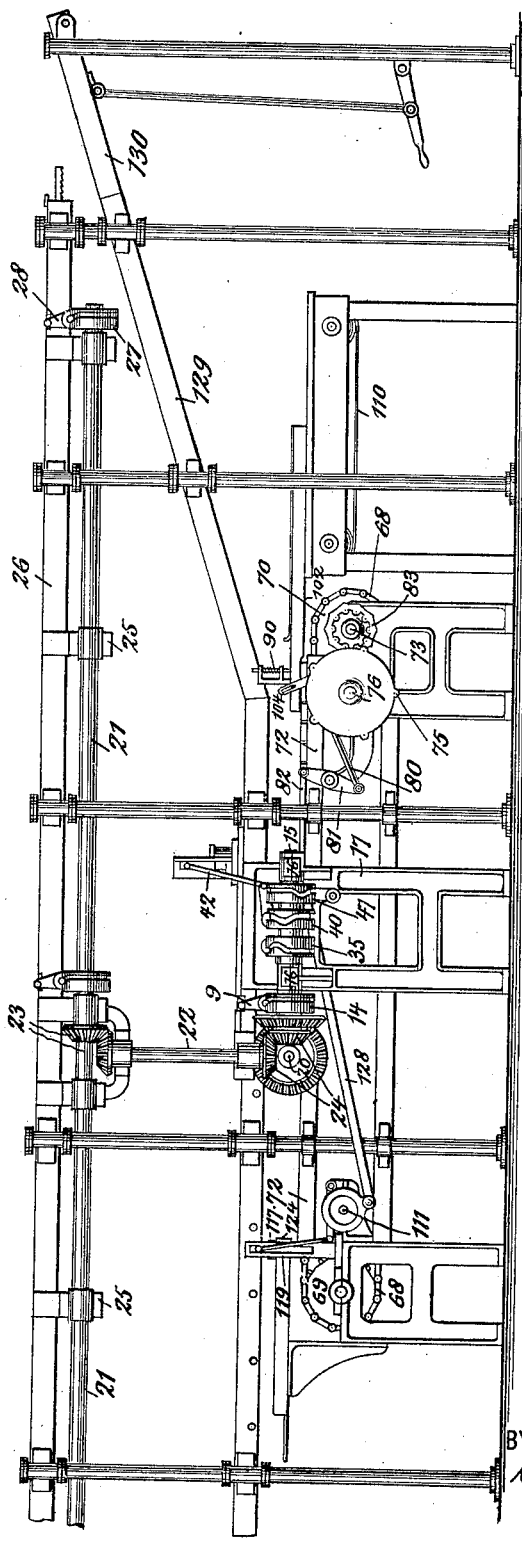

No. 704,511. Patented July 15, 1902.
A. B. CALKINS.
SPLINT BOXING MACHINERY.
(Application filed May 31, 1901.)
(No Model.) 10 Sheets—Sheet 1.

WITNESSES:
Harry Goss.
J. Wares Bryce

INVENTOR
Almon B. Calkins
BY
D. Howard Haymon
HIS ATTORNEY

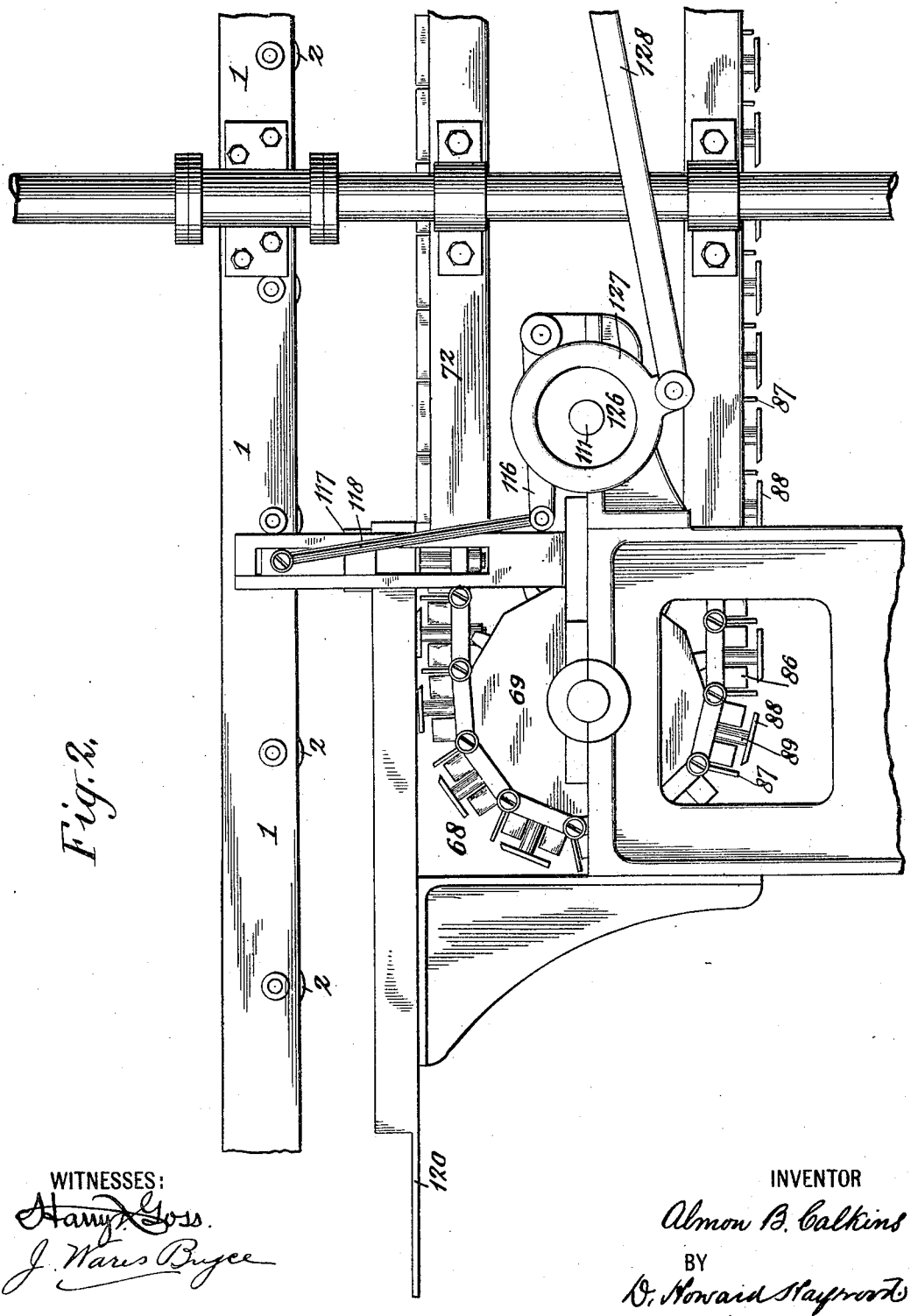

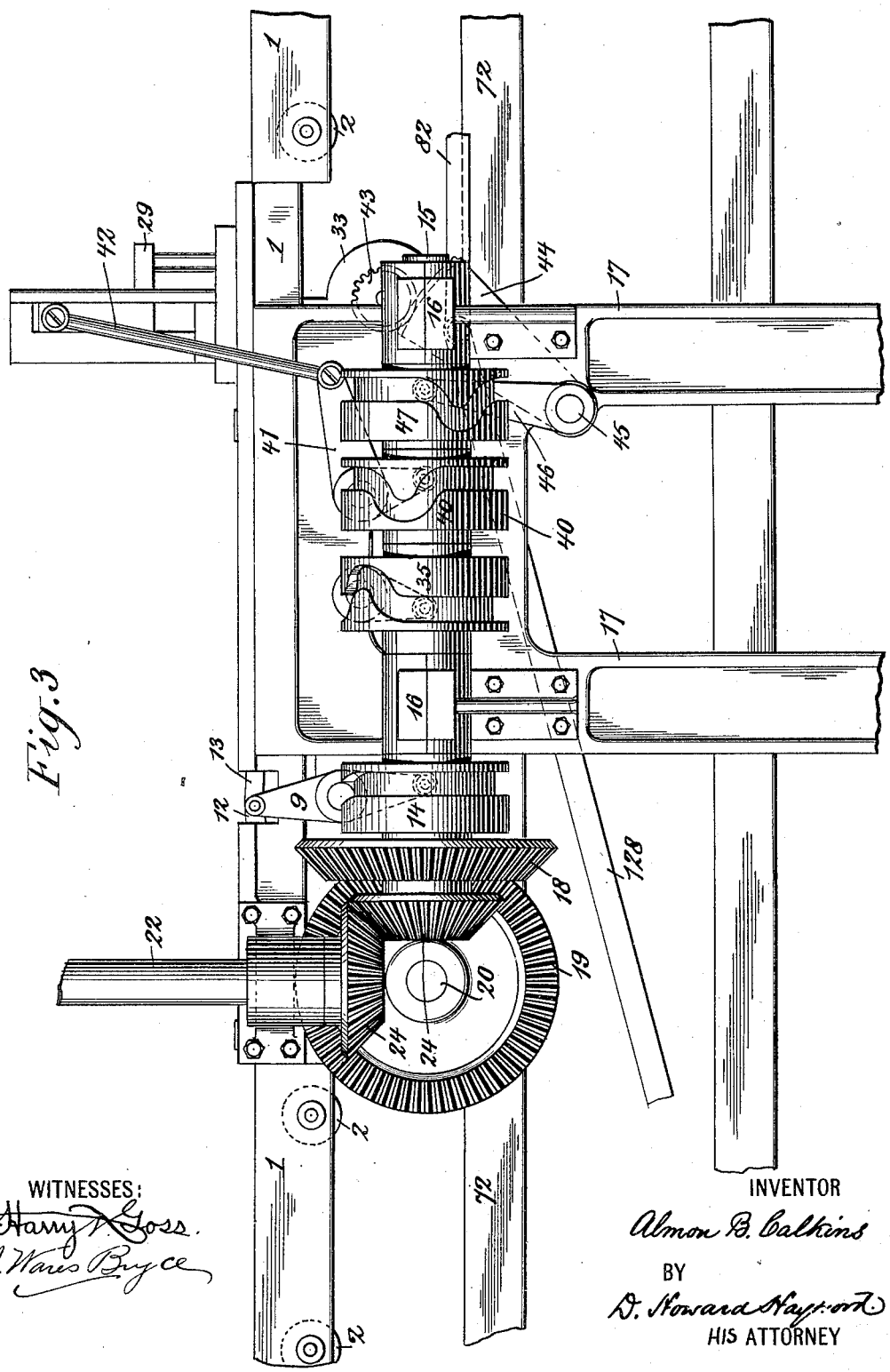

No. 704,511. Patented July 15, 1902.
A. B. CALKINS.
SPLINT BOXING MACHINERY.
(Application filed May 31, 1901.)
(No Model.) 10 Sheets—Sheet 4.
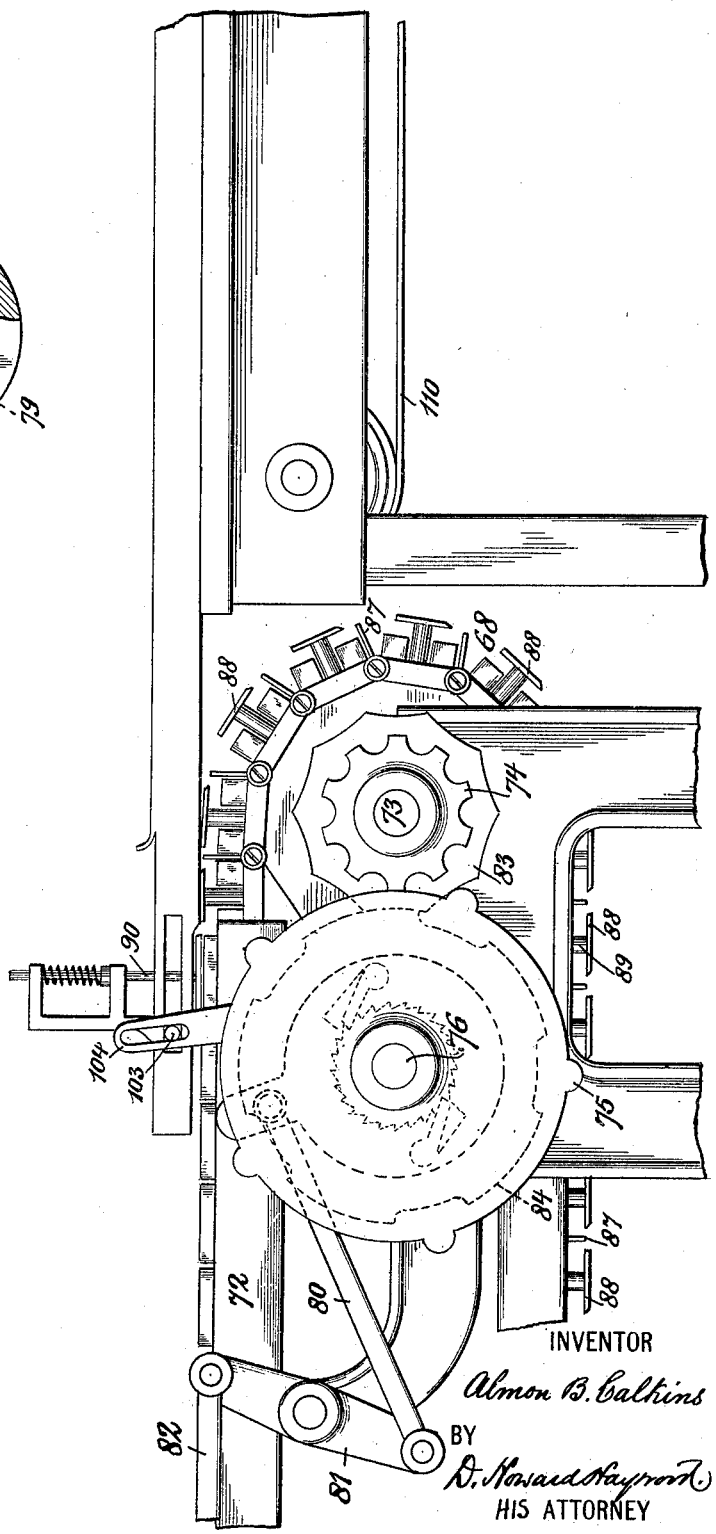

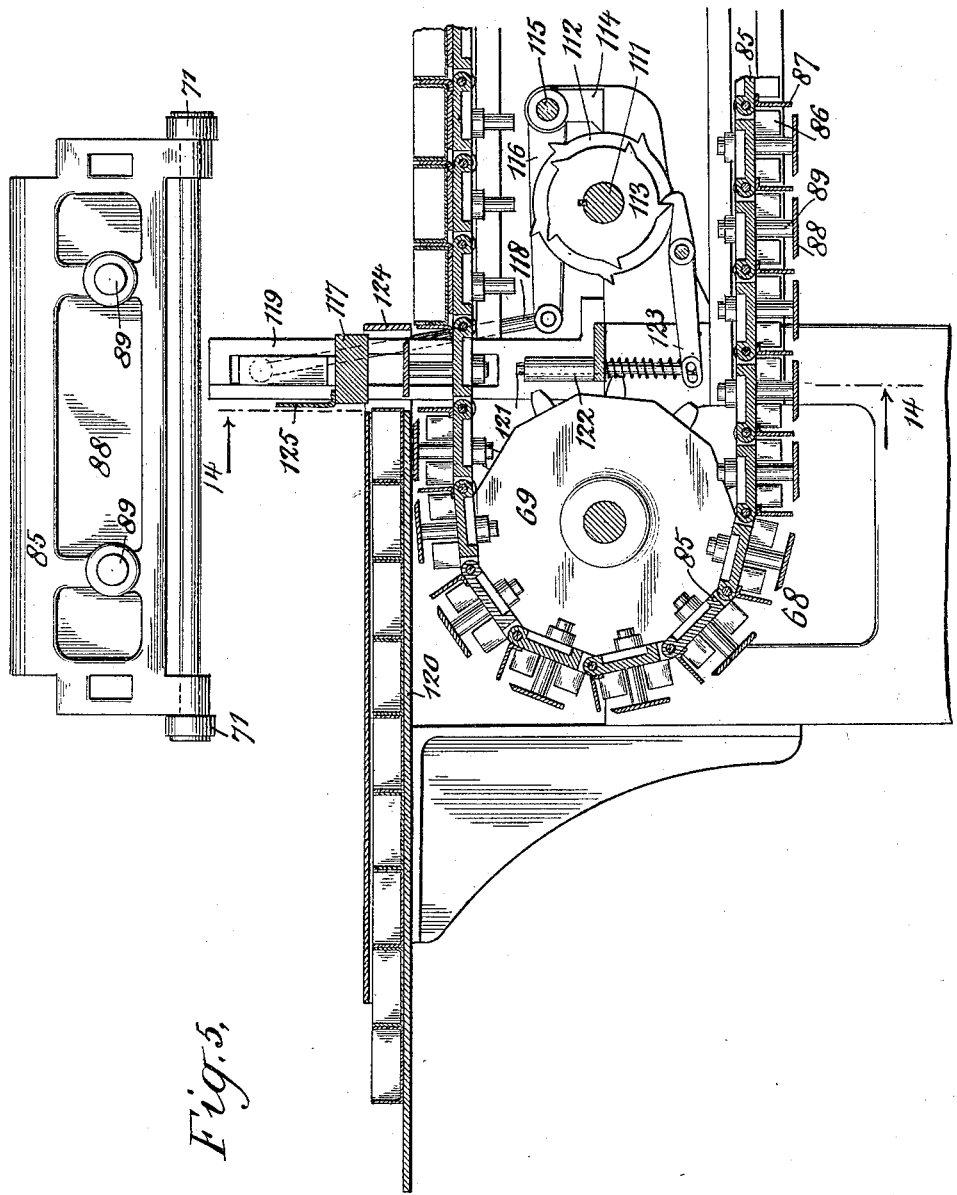

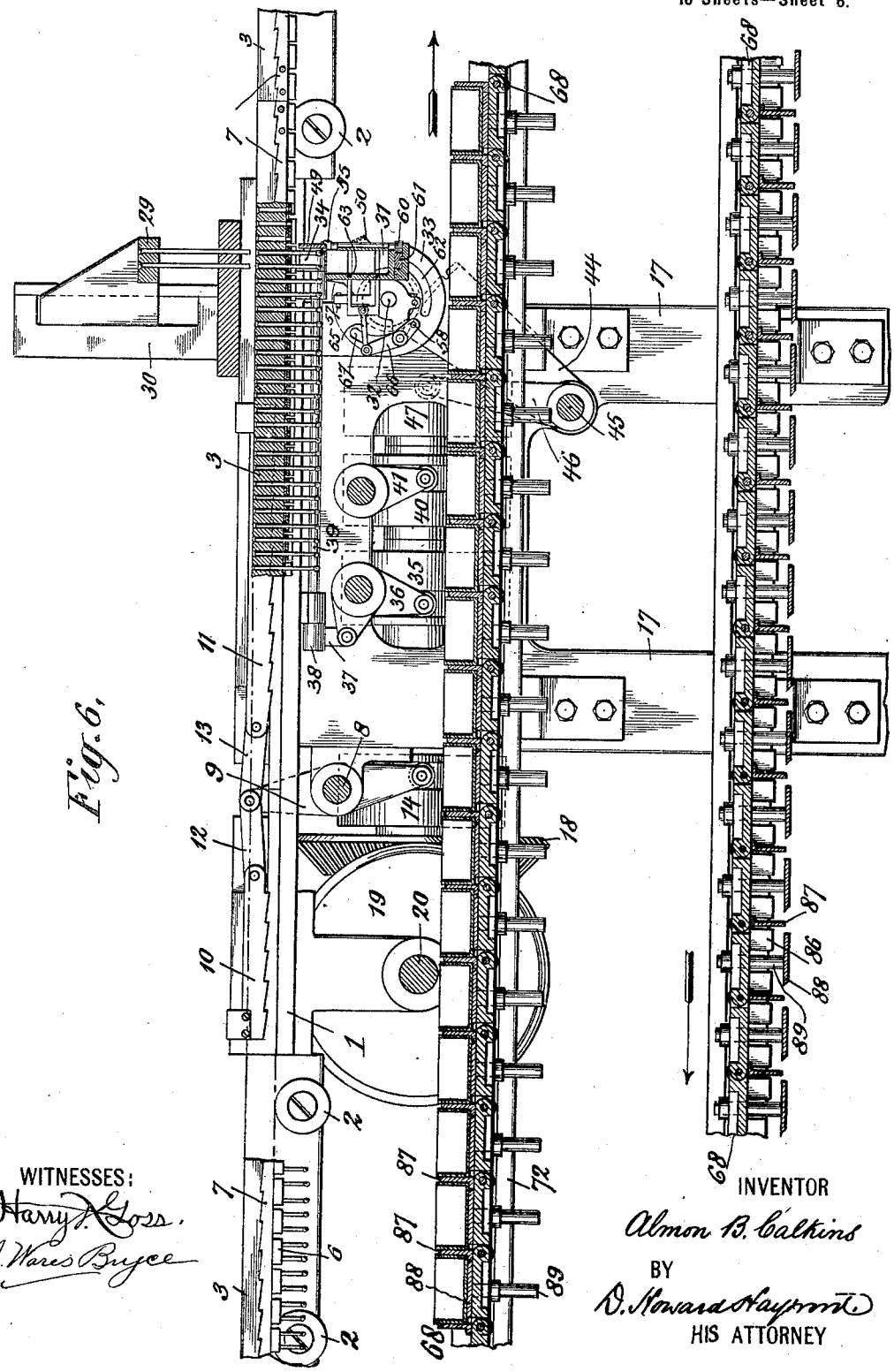

No. 704,511. Patented July 15, 1902.
A. B. CALKINS.
SPLINT BOXING MACHINERY.
(Application filed May 31, 1901.)
(No Model.) 10 Sheets—Sheet 7.
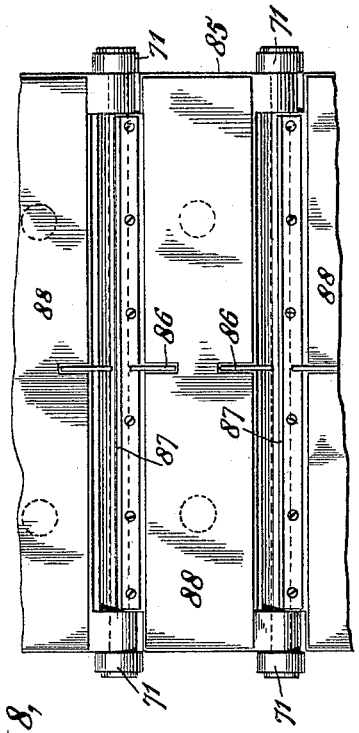
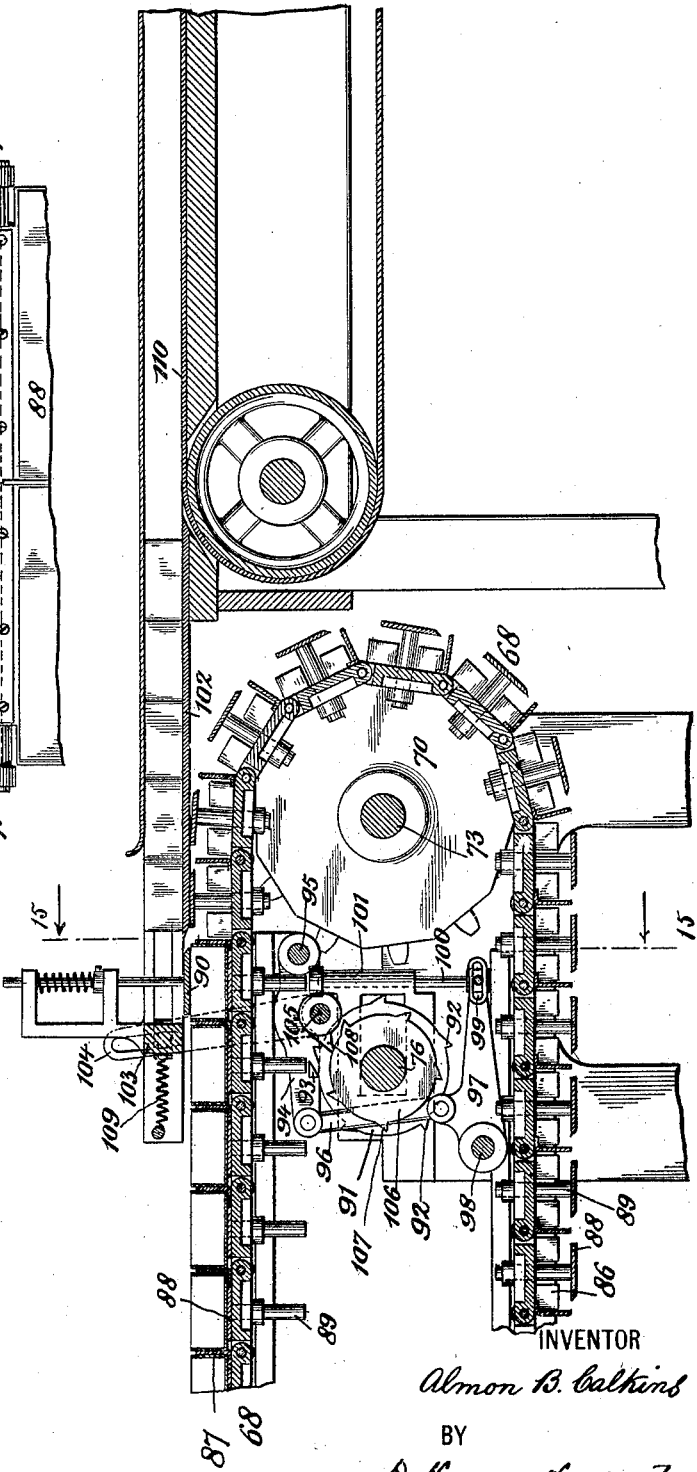
WITNESSES:
Harry E. Goss.
J. Wares Bryce
INVENTOR
Almon B. Calkins
BY
D. Howard Haysworth
HIS ATTORNEY No. 704,511. Patented July 15, 1902.
A. B. CALKINS.
SPLINT BOXING MACHINERY.
(Application filed May 31, 1901.)

(No Model.) 10 Sheets—Sheet 8.

WITNESSES:
Harry A. Goss
J. Wares Bryce

INVENTOR
Almon B. Calkins
BY
D. Howard Haymond
HIS ATTORNEY

No. 704,511. Patented July 15, 1902.
A. B. CALKINS.
SPLINT BOXING MACHINERY.
(Application filed May 31, 1901.)
(No Model.) 10 Sheets—Sheet 9.

WITNESSES
Harry Goss.
J. Wares Bryce

INVENTOR
Almon B. Calkins
BY
D. Howard Haymond
HIS ATTORNEY

No. 704,511.  
A. B. CALKINS.  
SPLINT BOXING MACHINERY.  
(Application filed May 31, 1901.)  
(No Model.)  
Patented July 15, 1902.  
10 Sheets—Sheet 10.

WITNESSES:  
Harry P. Goss.  
J. Waus Bryce.

INVENTOR  
Almon B. Calkins  
BY  
D. Howard Hayward,  
HIS ATTORNEY

UNITED STATES PATENT OFFICE.

ALMON B. CALKINS, OF FRANKLIN, NEW JERSEY, ASSIGNOR TO AMERICAN MATCH MACHINE COMPANY, OF NEW YORK, N. Y., A CORPORATION OF NEW JERSEY.

SPLINT-BOXING MACHINERY.

SPECIFICATION forming part of Letters Patent No. 704,511, dated July 15, 1902.

Application filed May 31, 1901. Serial No. 62,499. (No model.)

*To all whom it may concern:*

Be it known that I, ALMON B. CALKINS, a citizen of the United States of America, and a resident of Franklin, in the county of Essex and State of New Jersey, have invented certain new and useful Improvements in Splint-Boxing Machinery, of which the following is a specification, reference being had to the accompanying drawings, forming a part thereof.

My invention relates to machinery for boxing splints, and particularly to machinery for boxing match-splints.

In the drawings herewith I have illustrated my invention as applied to boxing match-splints; but it will be understood that my apparatus is equally applicable to the boxing of other articles, such as toothpicks, &c.

My invention comprises an improved mechanism whereby the splints may be positively boxed by a series of forced movements without relying upon gravity for such purpose, as heretofore. By such mechanism a definite and predetermined number of splints may be inserted in each box without the danger of any such splints sticking or hanging back in the inclined grooves commonly employed, as has frequently happened in the past.

My invention further consists in improvements to this class of machinery whereby a very large quantity of splints may be boxed in a short space of time and in a simple and positive manner.

To these ends my invention consists in certain improvements to be hereinafter more fully set forth.

I will now proceed to describe a machine embodying my invention and will then point out the novel features in claims.

Figure 13:
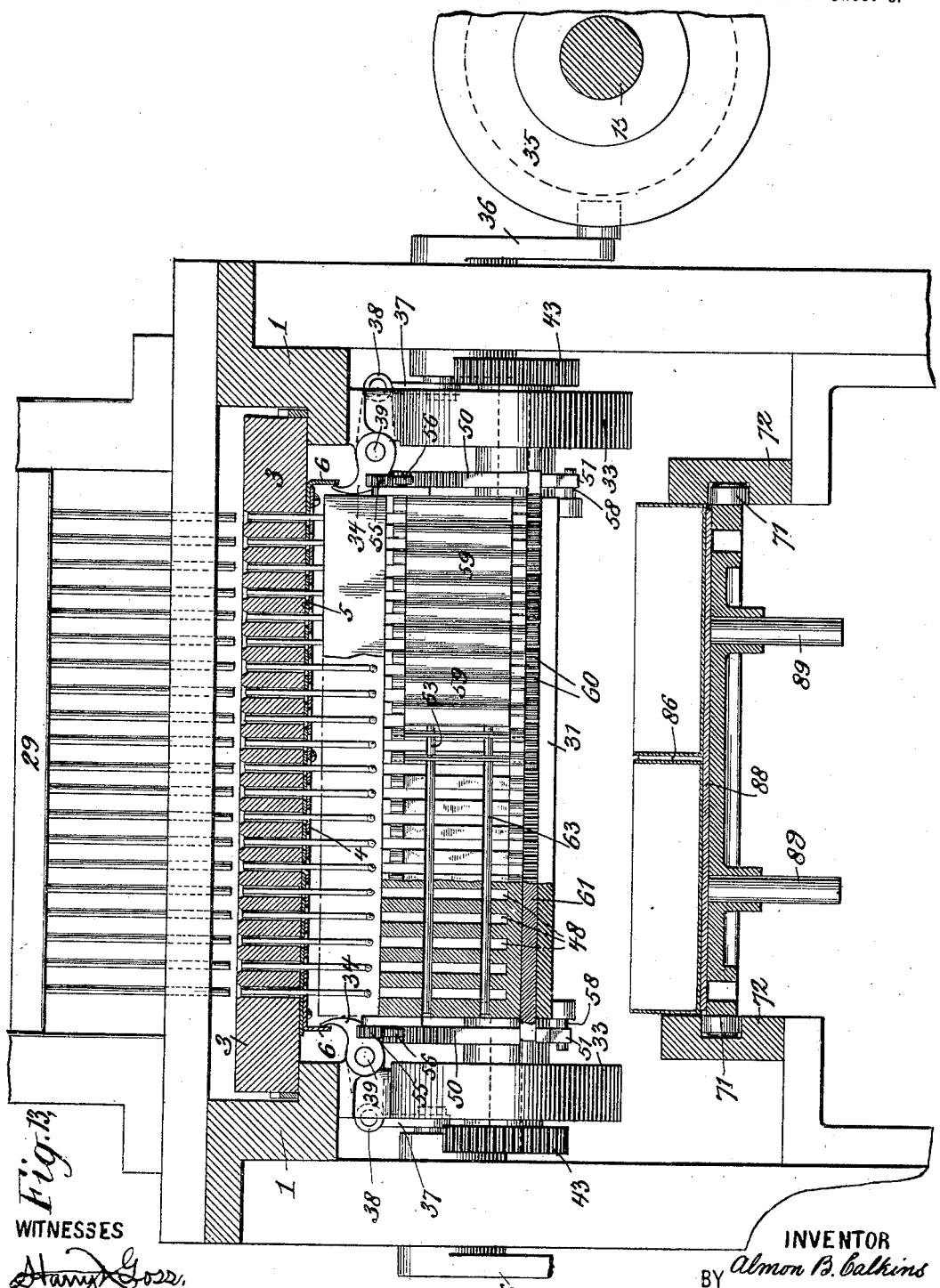

In the drawings, Figure 1 is a side elevation of splint-boxing machinery embodying my invention. Figs. 2, 3, and 4 are views in side elevation of certain portions shown in Fig. 1, but on a considerably-enlarged scale. Figs. 5, 6, and 7 are central longitudinal sectional elevations corresponding to Figs. 2, 3, and 4. Fig. 8 is a top view in detail, on a further-enlarged scale, of a portion of a box-conveyer chain employed. Fig. 9 is an under side view of one of the links. Fig. 10 is a view, partially in side elevation and partially in longitudinal section, of certain driving means employed. Fig. 11 is a detail transverse sectional elevation, on an enlarged scale, of certain parts shown in Fig. 6, such parts including a portion of a splint-carrier, a portion of the box-conveyer, a splint-conveyer, and certain other coacting and correlated parts. Fig. 12 is a view similar to Fig. 11, except that certain parts are in different positions to those in which the parts are shown in Fig. 11. Fig. 13 is a transverse sectional elevation through the splint-conveyer, one of the splint-carriers, the box-conveyer, and certain coacting and correlated parts. Fig. 14 is a view in transverse section of certain portions of the apparatus, the plane of section being taken upon the line 14 14 of Fig. 5. Fig. 15 is a view in transverse section of certain portions of the apparatus, the plane of section being taken upon the line 15 15 of Fig. 7. Fig. 16 is a top view of the splint-conveyer and certain correlated parts, the splint-conveyer being partially broken away in horizontal section in order to more fully illustrate the device.

The apparatus herein comprises, first, a runway for the match-carriers, which in this instance are a plurality of independent match-frames, along which the said frames are given an intermittent or step-by-step movement, a box-conveyer, also given a step-by-step movement and arranged beneath the carrier-runway, a conveyer arranged between the path of movement of the carriers and the box-conveyer and adapted to receive splints from the carriers, and means for moving the conveyer whereby splints received therein may be delivered to the boxes. I have also shown a return-runway for the carriers, along which they may be returned empty to the splint-cutting machine or elsewhere to receive more splints, to be again returned along the main runway first described.

The main runway comprises two side rails 1 1, the said side rails provided at various points throughout their lengths with antifriction-rollers 2 2, forming track-wheels upon which the carriers are adapted to travel.

The carriers 3 may be the ordinary type of match-frame, but preferably are of an improved form for which application for patent of the United States has already been made by Arthur N. Calkins, the serial number thereof being 39,212 and date of filing December 8, 1900. Such splint-carrier comprises a rectangular frame having a plurality of orifices therein arranged to loosely receive splints, such orifices being disposed in rows equidistantly apart. Beneath each row or plurality of rows two locking-plates 4 5 are arranged, the said locking-plates having locking-orifices which when pressed together are adapted to grasp the splints and hold them firmly in the carrier. The locking-plates have upturned ends, as 6, and upon pressure being applied thereto to force the said plates outwardly the splints will be released and will be free to fall by their own weight or to move under the influence of expelling means. The carriers are provided along their sides with suitable feed-racks 7, and such feed-racks are adapted to be engaged by suitable feeding means by which a step-by-step movement may be imparted to the said carriers. There may be a plurality of feeding means for the carriers arranged along the runway, according to the length of such runway. I have shown one such feeding means for the main runway; but it will be understood that I may duplicate such device as often as desired. The feeding means herein comprises a rock-shaft 8, upon which is mounted an operating-lever 9, the upper end thereof being connected to two feed-racks 10 and 11 by links 12 and 13. The feed-racks 10 and 11 are adapted to engage with the racks 7 upon the side of the carriers, and a cam 14 is provided to give a reciprocating movement to the operating-lever 9, and hence to the said feed-racks 10 and 11, whereby a step-by-step movement may be imparted to the carrier-frames.

The cam 14 is suitably mounted upon an operating-shaft 15, journaled in bearings 16, mounted upon a stationary frame 17. There are two of these operating-shafts 15, one arranged on either side of the machine, and each operating-shaft is provided with similar cams. All operations effected by the cams on these shafts are hence carried out in duplicate upon opposite sides of the machine. Each of the operating-shafts is provided with a miter-gear 18, said miter-gears engaging similar gears 19, secured to a transverse shaft 20. The operating-shafts are hence secured to rotate together in unison. The operating-shafts are driven from a line-shaft 21 through a vertical shaft 22 and suitable miter-gears 23 24. The line-shaft 21 is journaled in bearings 25, secured to upper side rails 26, which form the tracks of a return-runway for the carriers. The line-shaft 21 is provided with cams 27, which operate suitable feeding means for the carriers, such feeding means being similar to that previously described in connection with the main runway.

In their movement along the main runway the carrier-frames pass beneath a plunger-head 29, which is mounted in suitable stationary ways 30. The plunger-head is provided with a plurality of plunger-needles, which correspond with the orifices in the carriers. In the present instance the plunger-needles are arranged opposite two rows of orifices in the carriers, and a movable conveyer 31 is provided directly beneath the two rows which are in a line with the said plunger-needles. The movable conveyer 31 is secured to a shaft 32, journaled in suitable brackets 33, which are secured to and depend from the side rails 1.

Operating-fingers 34 are pivotally connected beneath both the side rails 1, and the said operating-fingers are rocked upon their supports by cams 35 through bell-crank levers 36, loosely-connected links 37, and arms 38, which are secured upon the finger-supporting shafts 39. The movement of the cams 35 give a rotary recirocating movement to the finger-supporting shaft 39, and hence give a reciprocating movement to the operating-fingers 34. Such movement will operate to move outwardly such locking-plates of the carriers 3 as are at that moment opposite the said fingers by reason of the fact that the turned-up portions 6 of the said locking-plates are at such times in the path of movement of the said fingers. Such movement of the locking-plates, as before stated, will unlock the splints of those rows controlled by the said locking-plates—in this instance the two rows which are beneath the said plunger. The splints being unlocked will now be free to fall into the conveyer 31 beneath them and in most instances will so fall by their own weight. In some instances, however, the splints may fail to so drop, and in order to force them into the conveyer I have provided the aforesaid expelling means. The said plunger-head 29 is operated by cams 40, secured upon the operating-shafts 15, which cams operate bell-crank levers 41, connected by links 42 with the said plunger-head 29. The said cams 14, 35, and 40 are so designed and positioned with relation to each other that the moment after each step-by-step forward movement has been given to the carrier-frames by the cams 14 the cams 35 will operate to open the locking-plates, and immediately thereafter the cams 40 will operate the expelling means, and the said splints will be forced into the conveyer. The next operation of the machine will be to so move the conveyer as to deliver the splints therein to a box which is at such time arranged beneath the conveyer. The conveyer-shaft 32 has gear-wheels 43, secured to opposite ends thereof, and sectors 44, which are mounted upon a transverse shaft 45, engage with the said gear-wheels. The sector-shaft 45 is journaled in suitable bearings arranged in the frame 17 of the machine. Operating-arms 46 are rigidly secured to the said shaft and at their opposite ends engage cams 47, secured upon the operating-shafts 15. The cams 47 will give such movement to the sectors 44 as to cause the conveyer 31 to rotate from the position shown in Fig. 11, which is the receiving position, through one-quarter of a revolution to the position shown in Fig. 12, which is the discharging position, and back again. In the discharging position the conveyer will deliver the splints received from the carriers to a box located beneath same. The active portions of the cams 47 are arranged to operate immediately after such portions of the cams 40. In other words, immediately the plunger has forced the splints into the conveyer the conveyer will be operated to deliver such splints to the box. The conveyer will then be promptly returned to its initial position and in such position will be ready to receive more splints.

The conveyer 31 has a plurality of splint-receiving openings 48, (see more particularly Fig. 13,) each of such openings being adapted to receive two splints from the carriers—that is, one splint from each of the two rows which are at that time beneath the plunger-needles. The conveyer is provided with a hinged door 49, which when closed closes the upper end of all of the said openings. When in position ready to receive splints from the carriers, such as shown in Figs. 6, 11, and 13, the said door is wide open; but when in position to deliver the splints the door is closed. The operation of opening and closing the door is effected in the following manner: Two sectors 50 are loosely mounted upon the conveyer-shaft 32, and pinions 55 are secured to the pivot-pins of the door 49. Idler-gears 56 are loosely mounted upon the conveyer and are in mesh with the sectors 50 and the pinions 55. The sectors 50 are arranged to engage the stationary side brackets 33 with greater frictional contact than they engage the shaft or movable conveyer, and hence the tendency of the said sectors will be to remain stationary. If then the sectors 50 remain stationary in the first movement of the conveyer, the pinions 55 and idlers 56 will be operated by the said sectors, and the door 49 of the conveyer will be closed. At the moment the door 49 is closed pins 57, secured upon arms of the conveyer, will engage the sectors 50, and during the further movement of the conveyer the sectors will move therewith, while the door 49 will be held closed. But for this fact the centrifugal force generated by the rapid movement of the conveyer would be likely to force the splints endwise out of the conveyer. Upon the first portion of the return movement of the conveyer the sectors 50 will remain stationary. Later pins 58 will engage with lugs 51 upon the sectors and compel the said sectors to move therewith. During the initial relative movement of the conveyer with respect to the sectors the door 49 will be opened, and thus as the conveyer moves up into position beneath the plunger it will be in a condition to receive other splints from the carriers. It is further desirable to close the front of the conveyer-openings 48, except at such times as the conveyer is delivering its splints. I have shown for this purpose a series of doors 59, one for each splint-receiver opening 48, and I have mounted the said doors on vertical pivot-pins. Each door 59 is provided with a pinion 60, and all of the said pinions engage with a rack-bar 61, suitably housed and carried by the conveyer. The ends of the rack-bar 61 extend beyond the conveyer into stationary cam-grooves 62, formed in the brackets 33, and the cam-grooves 62 are so formed that toward the end of the downward movement of the said conveyer the rack-bar 61 will be moved lengthwise of itself and will rotate all the doors 59 to open the front of the splint-receiving openings 48. The doors 59 are shown as having been so operated and as being so opened in Fig. 12 of the drawings. In like manner upon the commencement of the return movement of the conveyer the doors 59 will be closed and will remain closed during the remainder of the return movement of the conveyer.

I have also provided a means for expelling the splints from the conveyer, such means comprising two plunger-bars 63, carried by suitable heads 64 and connected by means of links 65 with operating-levers 66. The operating-levers 66 are pivotally mounted in arms which project from the conveyer-support, such arms being, in effect, a part of the conveyer. The operating-levers 66 connect at the opposite ends thereof to which the links 65 are connected with cam-slots 67, cut in the stationary brackets 33. The cam-slots 67 are eccentric of the conveyer-supporting shaft 32, as shown, and during the movement of the conveyer from its uppermost to its lowermost positions the plunger-bars 63 will be moved forwardly and in such movement will force the splints out of the splint-openings 48 in the conveyer. It will be noted that the bars 63 are mounted in slots which are arranged clear across the conveyer, and hence the two bars will operate upon the splints in all the openings therein, positively forcing out of the conveyer all the splints therein independently of the action of gravity. Upon the return movement of the conveyer to its uppermost position the bars will be withdrawn until they set back in recesses in the walls of the conveyer-openings, as clearly shown in Fig. 11.

The boxes to receive the splints are conveyed to the required point by means of an endless link conveyer 68. Such endless link conveyer passes at opposite ends around suitable sprocket-wheels 69 70. The sprocket-wheels 69 are idlers, and the sprocket-wheels 70 are suitably driven. The various links of the endless link conveyer 68 are provided with rollers 71, which travel in suitable tracks 72, secured to the frame of the apparatus, said rollers and tracks insuring the maintenance of the proper vertical position of the conveyer.

The sprocket-wheels 70 are secured to a transverse shaft 73, and secured to the said shaft near one end thereof is the driven member 74 of an operating device. The driving member 75 is secured to a second transverse shaft 76. The shaft 76 has also secured thereon a ratchet-wheel 77. (Shown in detail in Fig. 10 and in transverse section in Fig. 15.) A head 78 loosely surrounds the said ratchet and carries therein two pawls 79. The head 78 is connected by a link 80 with a rock-arm 81, said rock-arm being connected at the other side of its support by a link 82 with one of the sectors 44, and hence participating in the reciprocating movement of the said sector. The reciprocating movement of the sector is sufficient to cause a movement of the head 78 such a distance as to rotate the shaft 76 and ratchet-wheel 77 thereon a distance of one tooth of said ratchet. Each reciprocation of the said sector and head 78 will by reason of the fact that the ratchet-wheel is provided with twenty-five teeth cause a one twenty-fifth of a revolution of the shaft 26. The driving member 75, hereinbefore referred to, has five projections thereon, each projection adapted to engage with a corresponding depression in the driven member 74 upon the shaft 73. The shaft 76 will then by reason of the relative construction and arrangement of the parts be given four impulses without imparting any movement to the shaft 73, while upon the fifth impulse the shaft will be rotated one-tenth of a revolution. This will be just sufficient to move the conveyer a step forward the distance of one whole link. During the time the shaft 73 is not being operated it is locked against accidental movement by means of the locking-disks 83 and 84, with which the shafts 73 and 76 are respectively provided.

The endless link conveyer 68 comprises a plurality of links 85, which links are shown in detail in Figs. 8 and 9, such links being substantially the width of a box which it is desired to fill with splints and substantially twice the length thereof. Thus each link is adapted to convey two boxes disposed thereon end to end. Each link carries a separating-partition 86, which separates the two boxes carried thereby, and a partition 87, which separates the two boxes carried by one link from the two boxes carried by the next. The partitions 86 and 87 operate to correctly locate the boxes upon the conveyer and to prevent their being accidentally displaced. The tracks 72 serve to confine the outer end of the boxes to prevent endwise displacement, as shown more clearly in Fig. 13 of the drawings. Each link is further provided with a supporting-plate 88, having two guiding-stems 89 thereon, which are mounted in suitable orifices in the body portion of the link. The stems 89 fit the orifices somewhat snugly, and the frictional contact therein is sufficient to hold the plate 88 in any position in which it may be adjusted. When the boxes are in position on the links and are being conveyed beneath the plunger 29, the plates 88 will be adjusted inwardly and will be flat against the face of the said links. The boxes will rest upon the top of these plates, as clearly shown in the drawings. After the boxes have been filled with splints and have been moved along step by step they will finally be brought beneath a spring-operated presser-plate 90.

Secured upon the shaft 76 is a wheel 91, having a plurality of cam projections 92. These cam projections are adapted in the movement of the wheel 91 to pass beneath a projection 93 upon an arm 94, pivotally supported at 95 and connected at its outer end by a link 96 with a lever 97, pivotally supported at 98. The outer end of the lever 97 has a slotted connection 99 with plungers 100, which plungers slide in suitable slideways 101, arranged immediately beneath the guiding-stems 89 of the plate 88, carried by such conveyer-link as is at that moment at rest beneath the spring-plunger 90.

The movement of the arm 94 by the engagement of the projecting portion 93 thereof with the cam projections 92 of the wheel 91 is magnified through the lever 97, and a movement is imparted to the plungers 100 which is sufficient to lift the said supporting-plate 88 a distance sufficient to lift the boxful of splints thereon clear of the link conveyer and in line with a delivery-table 102. The presser-plate 90 being spring-operated will permit this lifting of the box, while at the same time the splints therein will be held from accidental displacement.

As the boxful of splints is lifted to a point in a line with the table 102 a pusher 103 in engagement with an arm 104, secured upon a shaft 105, will be forced forward and in its movement will push the box which has just been so lifted along the table 102 and will further push forward at the same time any of the boxes in advance thereof. The arm 104 is operated by another cam-wheel 106, which has a plurality of cam projections 107, arranged to operate just later than the cam projections 92. The cam projections 107 engage at the proper moment with a toe 108, secured to the same shaft 105 to which is secured the arm 104. A spring 109 is provided to return the pusher 103 to its normal position, while the parts operated by the cam projections 92 of the wheel 91 are returned to their normal positions by gravity. The boxes are pushed along the table 102 until finally they reach a traveling belt 110 and from there may be removed for the purpose of putting on the covers or tubes or may be carried to any other place, as may be desired.

It will be noted that the front edges of the plates 88 are beveled, as is also the rear edge of the delivery-table 102, and that hence in the forward movement of the box-conveyer the plates will be slightly depressed in order that they may pass beneath the said delivery-table.

Near the opposite end of the conveyer to that at which the shaft 76 is located is arranged a corresponding shaft 111, and the said shaft has secured thereon two cam-wheels 112 and 113, which correspond with the wheels 91 and 106, respectively, upon the said shaft 76. The cam 112 is arranged to engage with a short arm 114, secured upon a shaft 115, upon which is also secured levers 116. The levers 116 are connected at their outer ends with a head 117 by means of a link 118, and the head 117 is mounted to slide in suitable ways 119.

The empty boxes which it is desired to introduce upon the link conveyer are supported upon a table 120, arranged at the rear of the said conveyer and in a plane above the level thereof. Those links of the conveyer which are at the rear of the front end of the table 120 will have their supporting-plates 88 in their upper positions, said plates having been forced into such positions at the time they were opposite the plungers 100, and the links, with their supporting-plates in such position, will be brought consecutively beneath the head 117. Such plates will, however, be slightly beneath the level of the upper end of the table 120, and I have arranged a secondary set of plungers 121, mounted in suitable slideways 122 and operated by a lever 123, which is in engagement with the cam-wheel 113, to force the said supporting-plates to their extreme uppermost position at such time, so that their upper surface shall be brought into a line with the upper surface of the table 120. At such time the boxes supported upon the table 120 may be pushed forwardly until the front box is stopped by the supporting-plate 88. Upon the reciprocation of the head 117 under the influence of the cam 112 the said head will first enter the box arranged beneath it and will then force the said box downwardly and with it the supporting-plate 88 of that link which is supporting it. The head will then return to its uppermost position and the conveyer will be free to be moved forwardly. I have provided the front edge of the head 117 with a shield 125, which will prevent the boxes being moved forwardly by hand while the head is in a depressed position.

It will of course be understood that the cams 112 and 113 are so constructed and positioned with respect to each other and with the step-by-step operating means for the movement of the link conveyer as a whole that the plungers 121 will be operated immediately after a step-by-step movement of the link conveyer as a whole and that the head 117 will be caused to reciprocate immediately before the following movement of the link conveyer as a whole.

The shaft 111 is provided with a ratchet-wheel 126 and an operating-head 127, similar to the ratchet-wheel 77 and operating-head 78 of the shaft 76, and the said operating-head is connected by a link 128 with the sector 44 and partakes of its movement.

I have provided an extension 129 of the main runway for the carriers at the forward end thereof, such extension being arranged at an angle thereto and ascending to the level of the return-runway arranged above it. I have also provided a hand-operated switch 130, by which carriers on the inclined extension may be transferred to the said return-runway.

It will be understood that the apparatus shown and described in the foregoing is but one form of apparatus embodying my invention and that the same may be modified and varied within wide limits within the spirit and scope of my invention.

What I claim is—

1. In splint-boxing machinery, the combination with means for feeding forward splint-carriers, and means for supporting a box to receive splints therefrom, of a reciprocating conveyer adapted to receive splints from the carriers, and in its movement to convey them to the box, and an expelling-plunger adapted to move within and across the space occupied by the splints when at rest within the conveyer, to forcibly expel the splints therefrom.

2. In splint-boxing machinery, the combination with means for feeding forward splint-carriers, and means for supporting a box to receive splints therefrom, of a reciprocating conveyer adapted to receive splints from the carriers, and in its movement to convey them to the box, and an expelling-plunger, operated by the movement of the conveyer, adapted to move within and across the space occupied by the splints when at rest within the conveyer, to forcibly expel the splints therefrom.

3. In splint-boxing machinery, the combination with means for feeding forward splint-carriers and ejecting mechanism for ejecting splints therefrom, of an oscillatory conveyer and operating mechanism therefor arranged to move said conveyer from a receiving position adjacent to the path of said carriers to a discharging position during intervals between the ejection of said splints, and an expelling-plunger adapted to move within and across the space occupied by the splints when at rest within the conveyer, to forcibly expel the splints therefrom.

4. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a follower adapted to be moved across the said opening, to expel the splints therefrom, and means for causing the movement of the conveyer to so operate said follower.

5. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a follower adapted to be moved across the said opening, to expel the splints therefrom, and means for simultaneously moving the conveyer, and for so moving the follower relatively thereof.

6. In splint-boxing machinery, the combination with means for feeding forward splint-carriers, and means for supporting a box to receive splints therefrom, of a movable conveyer having an opening therein for receiving splints from the carriers, and adapted in its movement to convey them to the box, a follower adapted to be moved across the said opening, to expel the splints therefrom, and means, operated by the movement of the conveyer, for so moving the follower.

7. In splint-boxing machinery, the combination with means for feeding forward splint-carriers, and means for supporting a box to receive splints therefrom, of a movable conveyer, having a plurality of openings therein for receiving splints from the carriers, and adapted in its movement to convey the said splints to the box, and a follower adapted to be moved across the said openings, to expel the splints therefrom.

8. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a follower adapted to be moved across the said opening, to expel the splints therefrom, and a stationary cam arranged to move said follower outward to eject the splints during motion of the conveyer toward the box.

9. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a follower adapted to be moved across the said opening to expel the splints therefrom, a stationary cam, a lever in engagement with said stationary cam, and a link connection between said follower and said lever, said cam being arranged to be engaged by said lever during motion of the conveyer toward the box.

10. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a follower normally seated in a recess in the rear wall of said opening, and adapted to be moved across the said openings, to expel the splints therefrom, and a cam arranged to operate said follower to expel the splints during motion of the conveyer to the discharging position.

11. In splint-boxing machinery, the combination with means for feeding forward splint-carriers, of a conveyer movable in a curved path adapted to convey splints from the carriers to a discharging-point, means carried by the conveyer for preventing escape of splints from said conveyer, during the motion thereof, by reason of centrifugal action, and means, independent of the conveyer, for bringing boxes into position to be filled from said conveyer.

12. In splint-boxing machinery, the combination with means for feeding forward splint-carriers, of a movable conveyer adapted to convey splints from the carriers to a discharging-point and having separate splint receiving and discharging openings, means carried by the conveyer for closing said receiving-opening during motion of the conveyer, and means, independent of the conveyer, for bringing boxes into position to be filled from said conveyer.

13. In splint-boxing machinery, the combination with means for feeding forward splint-carriers, of a rotary conveyer adapted to convey splints from the carriers to a discharging-point and having separate splint receiving and discharging openings, means carried by the conveyer for closing said discharging-openings during motion of the conveyer, and means, independent of the conveyer, for bringing boxes into position to be filled from said conveyer.

14. In splint-boxing machinery, the combination with means for feeding forward splint-carriers, of a movable conveyer adapted to convey splints from the carriers to a discharging-point and having separate splint receiving and discharging openings, means carried by said conveyer for closing said receiving and discharging openings independently during motion of the conveyer, and means, independent of the conveyer, for bringing boxes into position to be filled from said conveyer.

15. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, and means carried by the conveyer for closing the said opening during a movement of the conveyer.

16. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, and means, carried by the conveyer and operated thereby in its movement, for closing the said opening, during a portion of its said movement.

17. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for the said opening, and means for closing said door during a movement of the conveyer.

18. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for said opening, and means operated by the conveyer, upon its movement for closing the said door.

19. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for the admission end of the opening in said conveyer, and means for closing the said door during a movement of the conveyer.

20. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for the admission end of the opening in said conveyer, and means, operated by the conveyer in its movement, for closing and opening the said door.

21. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, an ejecting device for said conveyer, a door for the discharge end of the opening in said conveyer, and means for closing the said door during a movement of the conveyer.

22. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a hinged door for the discharge end of the opening in the said conveyer, and means, operated by the conveyer in its movement, for closing and opening the said door.

23. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for the admission end of the opening in said conveyer, another door for the discharge end thereof, and means for closing the said doors during a movement of the conveyer.

24. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for the admission end of the opening in said conveyer, another door for the discharge end thereof, and means, operated by the conveyer in its movement, for closing and opening the said doors.

25. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a door for the admission end of the opening in said conveyer, another door for the discharge end thereof, and means for opening the admission-door at one end of a stroke of the conveyer, and the discharge-door at the other end of such stroke, and for closing both doors in intermediate positions of the conveyer.

26. In splint-boxing machinery, the combination with means for feeding forward splint-carriers, and means for supporting a box to receive splints therefrom, of a movable conveyer having an opening therein for receiving splints from the carriers, and adapted in its movement to convey the said splints to the box, a hinged door for the said opening, a pinion secured to said door, a gear-sector in gear with said pinion, and means whereby said sector may move with said conveyer, but is adapted to have a limited relative movement thereof.

27. In splint-boxing machinery, the combination with means for feeding forward splint-carriers, and means for supporting a box to receive splints therefrom, of a movable conveyer, having a plurality of openings therein for receiving splints from the carriers, and adapted in its movement to convey the said splints to the box, of a plurality of hinged doors for the said openings, pinions secured to the said doors, a rack-bar in engagement with the said pinions, and means for operating the said rack-bar.

28. In splint-boxing machinery, the combination with means for feeding forward splint-carriers, and means for supporting a box to receive splints therefrom, of a movable conveyer having a plurality of openings therein for receiving splints from the carriers, and adapted in its movement to convey the said splints to the box, of a plurality of hinged doors for the said openings, pinions secured to the said doors, a rack-bar in engagement with the said pinions, and a cam for operating the said rack-bar.

29. In splint-boxing machinery, the combination with means for feeding forward splint-carriers, and means for supporting a box to receive splints therefrom, of a movable conveyer having a plurality of openings therein for receiving splints from the carriers, and adapted in its movement to convey the said splints to the box, of a plurality of hinged doors for the said openings, pinions secured to the said doors, a rack-bar in engagement with the said pinions, and two stationary cams, one at each end of the said rack-bar, and adapted to operate same.

30. In splint-boxing machinery, the combination with means for feeding forward splint-carriers, and means for supporting a box to receive splints therefrom, of a pivoted conveyer adapted to receive splints from said carriers and convey the same to boxes, and arranged tangentially with respect to its path of movement.

31. In splint-boxing machinery, the combination with a traveling box-conveyer having a plurality of relatively movable box-supporting plates carried thereby, of means for raising and lowering the level of said plates with respect to the conveyer.

32. In splint-boxing machinery, the combination with a traveling box-conveyer having a plurality of relatively movable box-supporting plates, carried thereby, of means for inserting splints into boxes supported thereon, and means for raising the said plates with respect to the conveyer, after the said plates have traveled past the splint-inserting means.

33. In splint-boxing machinery, the combination with a traveling box-conveyer having a plurality of relatively movable box-supporting plates, carried thereby, of a delivery-table, and means for raising the said plates when in proximity with the said delivery-table.

34. In splint-boxing machinery, the combination with a traveling box-conveyer having a plurality of relatively movable box-supporting plates, carried thereby, of a cam for raising the said plates with respect to the conveyer.

35. In splint-boxing machinery, the combination with a traveling box-conveyer having a plurality of relatively movable box-supporting plates carried thereby, of a delivery-table arranged above the level of the said plates when in their lowered position with respect to the conveyer, and means for raising the said plates to the level of the said delivery-table.

36. In splint-boxing machinery, the combination with a traveling box-conveyer having a plurality of relatively movable box-supporting plates carried thereby, of a table arranged above the level of the said plates when in their lowered position with respect to the conveyer, and means for raising the said plates to the level of the said table.

37. In splint-boxing machinery, the combination with a traveling box-conveyer having a plurality of relatively movable box-supporting plates carried thereby, of a delivery-table, and means for raising the said plates when in proximity with the said delivery-table, and for delivering the boxes so raised to the delivery-table.

38. In splint-boxing machinery, the combination with a traveling box-conveyer having a plurality of relatively movable box-supporting plates carried thereby, of a delivery-table arranged above the level of the said plates when in their lowered position with respect to the conveyer, and means for raising the said plates to the level of the said delivery-table and for delivering the boxes so raised to the delivery-table.

39. In splint-boxing machinery, the combination with a traveling box-conveyer having a plurality of relatively movable box-supporting plates carried thereby, of a delivery-table arranged above the level of the said plates when in their lowered position with respect to the conveyer, and means for raising the said plates to the level of the said delivery-table, when in proximity thereto, and for lowering the said plates to permit them to pass beneath the said table.

40. In splint-boxing machinery, the combination with a traveling box-conveyer having a plurality of relatively movable box-supporting plates carried thereby, of a delivery-table arranged above the level of the said plates when in their lowered position with respect to the conveyer, and means for raising the said plates to the level of the said delivery-table, when in proximity thereto, the front edges of the said plates, and the rear edge of the said table, being beveled.

41. In splint-boxing machinery, the combination with a traveling box-conveyer having a plurality of relatively movable box-supporting plates, carried thereby, of a delivery-table arranged above the level of the said plates when in their lowered position with respect to the conveyer, and a cam for raising the said plates to the level of the said delivery-table, the front edges of the said plates, and the rear edge of the said table, being beveled.

42. In splint-boxing machinery, the combination with a traveling box-conveyer having a plurality of relatively movable box-supporting plates, carried thereby, of a delivery-table, means for raising the said plates when in proximity with the said delivery-table, and a pusher for delivering the boxes so raised to the delivery-table.

43. In splint-boxing machinery, the combination with a traveling box-conveyer having a plurality of relatively movable box-supporting plates, carried thereby, of a delivery-table arranged above the level of the said plates when in their lowered position with respect to the conveyer, means for raising the said plates to the level of the said delivery-table, a pusher for delivering the boxes so raised to the delivery-table, and means for lowering the plates, after the boxes have been removed therefrom, to permit the said plates to pass beneath the said table.

44. In splint-boxing machinery, the combination with a traveling box-conveyer having a plurality of relatively movable box-supporting plates, carried thereby, of a delivery-table arranged above the level of the said plates when in their lowered position with respect to the conveyer, means for raising the said plates to the level of the said delivery-table, and a pusher for delivering the boxes so raised to the delivery-table, the front edges of the said plates, and the rear edge of the said table, being beveled.

45. In splint-boxing machinery, the combination with a traveling box-conveyer having a plurality of relatively movable box-supporting plates carried thereby, of a delivery-table, means for raising the said plates when in proximity with the said delivery-table, and a presser-plate, arranged above the said supporting-plates when they are so raised.

46. In splint-boxing machinery, the combination with a traveling box-conveyer, having a plurality of relatively movable box-suporting plates carried thereby, of a delivery-table, means for raising the said plates when in proximity with the said delivery-table, and a spring-actuated presser-plate, arranged above the said supporting-plates when they are so raised.

47. In splint-boxing machinery, the combination with a traveling box-conveyer having a plurality of relatively movable box-supporting plates carried thereby, of a delivery-table arranged above the level of the said plates when in their lowered position with respect to the conveyer, means for raising the said plates to the level of the said delivery-table, a spring-actuated presser-plate thereabove, and means for delivering the boxes so raised to the delivery-table.

48. In splint-boxing machinery, the combination with a traveling box-conveyer having a plurality of relatively movable box-supporting plates carried thereby, of a feed-table arranged above the level of the said plates when in their lowered position with respect to the conveyer, and means for raising said plates with respect to the conveyer, when in proximity to the end of the said table.

49. In splint-boxing machinery, the combination with a traveling box-conveyer having a plurality of relatively movable box-supporting plates carried thereby, of a feed-table arranged above the level of the said plates when in their lowered position with respect to the conveyer, and means for raising said plates to the level of the said feed-table.

50. In splint-boxing machinery, the combination with a traveling box-conveyer having a plurality of relatively movable box-supporting plates carried thereby, of a feed-table arranged above the level of the said plates when in their lowered position with respect to the conveyer, means for raising the said plates when in proximity to the end of the said table, and a reciprocating plunger arranged above the said plates, at the point at which they are raised.

51. In splint-boxing machinery, the combination with a traveling box-conveyer having a plurality of relatively movable box-supporting plates carried thereby, of a feed-table arranged above the level of the said plates when in their lowered position with respect to the conveyer, means for raising the said plates to the level of the said feed-table, and a reciprocating plunger arranged above the said plates, at the point at which they are raised.

52. In splint-boxing machinery, the combination with a traveling box-conveyer having a plurality of relatively movable box-supporting plates carried thereby, of a feed-table arranged above the level of the said plates when in their lowered position with respect to the conveyer, means for raising said plates when in proximity to the end of said table, means whereby a box may be introduced upon a plate when so raised, and means for depressing the said plate carrying the said box.

53. In splint-boxing machinery, the combination with a traveling box-conveyer having a plurality of relatively movable box-supporting plates carried thereby, of a feed-table arranged above the level of the said plates when in their lowered position with respect to the conveyer, means for raising said plates to the level of the said feed-table, means whereby a box may be introduced upon a plate when so raised, and a reciprocating plunger arranged above said plates, at the point at which they are raised, and adapted in its movement to lower the said plates.

54. In splint-boxing machinery, the combination with a traveling box-conveyer having a plurality of relatively movable box-supporting plates carried thereby, of a feed-table arranged above the level of the said plates when in their lowered position with respect to the conveyer, a cam for raising the said plates, when in proximity to one end of said table, a reciprocating plunger arranged above said plates, at the point at which they are raised, and adapted in its movement to lower the said plates, and a cam for causing the reciprocation of the said plunger.

55. In splint-boxing machinery, the combination with a traveling box-conveyer having a plurality of box-supporting plates carried thereby, of a feed-table, and a delivery-table therefor, each arranged above the level of the said plates when in their lowered position with respect to the conveyer, means for raising said plates with respect to the conveyer, when in proximity with the said delivery-table and for lowering the said plates with respect to the conveyer when in proximity with the said feed-table.

56. In splint-boxing machinery, the combination with means for imparting a step-by-step movement to splint-carriers, a box-conveyer, and means for imparting a step-by-step movement thereto, of a splint-conveyer, movable in a curved path, adapted to receive splints from the carriers and in its movement to deliver same to the box, and means carried by the conveyer for preventing escape of splints from the conveyer during motion thereof toward the box, by reason of centrifugal action.

57. In splint-boxing machinery, the combination with means for imparting a step-by-step movement to splint-carriers, said splint-carriers provided with splint-locking plates, of a rock-shaft, a finger thereon adapted to engage said locking-plates, and a cam for operating said rock-shaft, said cam adapted to operate the said rock-shaft, intermediate of the step-by-step movements of the carriers.

58. In splint-boxing machinery, the combination with means for imparting a step-by-step movement to splint-carriers, said splint-carriers provided with splint-locking plates, of two rock-shafts, fingers thereon adapted to engage said locking-plates, and means for operating said rock-shafts intermediate of the step-by-step movements of the carriers.

59. In splint-boxing machinery, the combination with splint-carriers, and means for supporting a box to receive splints therefrom, of a movable conveyer having an opening therein for receiving splints from the carriers, and adapted in its movement to convey the said splints to the box, a follower adapted to be moved across the said opening, to expel the splints therefrom, and means for causing the movement of the conveyer to so operate said follower.

60. In splint-boxing machinery, the combination with splint-carriers, and means for supporting a box to receive splints therefrom, of a movable conveyer having an opening therein for receiving splints from the carriers, and adapted in its movement to convey the said splints to the box, and means carried by the conveyer for closing the said opening during a movement of the conveyer.

61. In splint-boxing machinery, the combination with splint-carriers, and means for supporting a box to receive splints therefrom, of a movable conveyer having an opening therein for receiving splints from the carriers, and adapted in its movement to convey the said splints to the box, and means, carried by the conveyer and operated thereby in its movement, for closing the said opening, during a portion of its said movement.

62. In splint-boxing machinery, the combination with splint-carriers, and means for supporting a box to receive splints therefrom, of a movable conveyer having an opening therein for receiving splints from the carriers, and adapted in its movement to convey the said splints to the box, a door for the said opening, and means for closing said door during a movement of the conveyer.

63. In splint-boxing machinery, the combination with splint-carriers, and means for supporting a box to receive splints therefrom, of a movable conveyer having an opening therein for receiving splints from the carriers, and adapted in its movement to convey the said splints to the box, a door for said opening, and means operated by the conveyer, upon its movement, for closing the said door.

64. In splint-boxing machinery, the combination with splint-carriers, and means for supporting a box to receive splints therefrom, of a movable conveyer having an opening therein for receiving splints from the carriers, and adapted in its movement to convey the said splints to the box, a door for the admission end of the opening in said conveyer, and means for closing the said door during a movement of the conveyer.

65. In splint-boxing machinery, the combination with splint-carriers, and means for supporting a box to receive splints therefrom, of a movable conveyer having an opening therein for receiving splints from the carriers, and adapted in its movement to convey the said splints to the box, a door for the admission end of the opening in said conveyer, another door for the discharge end thereof, and means for closing the said doors during a movement of the conveyer.

66. In splint-boxing machinery, the combination with splint-carriers, and means for supporting a box to receive splints therefrom, of a movable conveyer having an opening therein for receiving splints from the carriers, and adapted in its movement to convey the said splints to the box, a door for the admission end of the opening in said conveyer, another door for the discharge end thereof, and means for opening the admission-door at one end of a stroke of the conveyer, and the discharge-door at the other end of such stroke, and for closing both doors in intermediate positions of the conveyer.

67. In splint-boxing machinery, the combination with splint-carriers, and means for supporting a box to receive splints therefrom, of a movable conveyer having an opening therein for receiving splints from the carriers, and adapted in its movement to convey the said splints to the box, a hinged door for the said opening, a pinion secured to said door, a gear-sector in gear with said pinion, and means whereby said sector may move with said conveyer, but is adapted to have a limited relative movement thereof.

68. In splint-boxing machinery, the combination with splint-carriers, and means for supporting a box to receive splints therefrom, of a movable conveyer having a plurality of openings therein for receiving splints from the carriers, and adapted in its movement to convey the said splints to the box, of a plurality of hinged doors for the said openings, pinions secured to the said doors, a rack-bar in engagement with the said pinions, and means for operating the said rack-bar.

ALMON B. CALKINS.

Witnesses:
HENRY WHITTEN,
GEORGE F. GREAR.